April 22, 1941.  A. E. WIGELSWORTH  2,239,164
APPARATUS FOR DETERMINATION OF HUMAN DARK ADAPTATION
Filed Aug. 5, 1939  2 Sheets-Sheet 1

Arthur E. Wigelsworth,
INVENTOR.

BY
ATTORNEYS

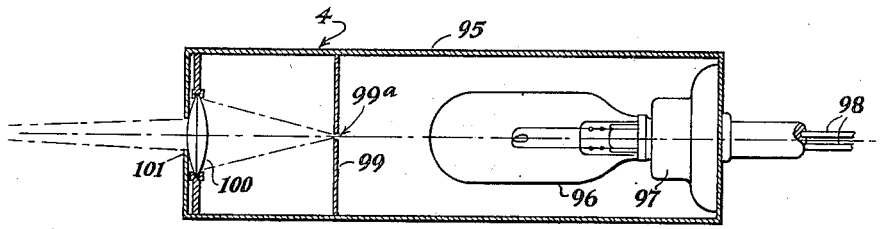
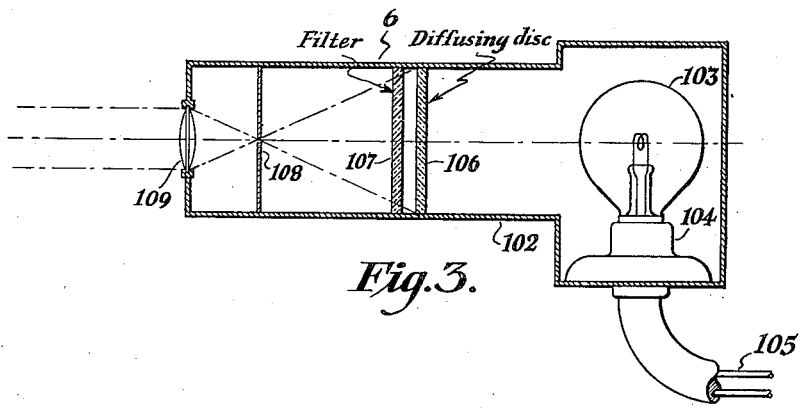
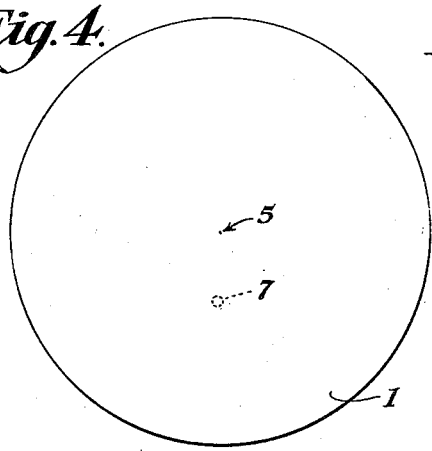
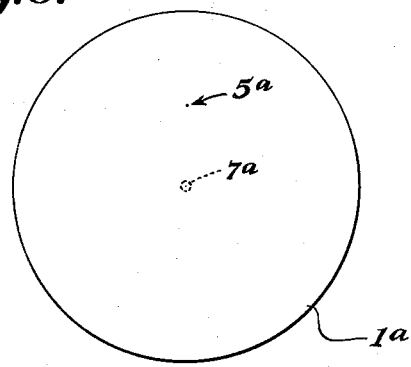

Patented Apr. 22, 1941

2,239,164

UNITED STATES PATENT OFFICE 2,239,164

APPARATUS FOR DETERMINATION OF HUMAN DARK ADAPTATION

Arthur E. Wigelsworth, Los Angeles, Calif.

Application August 5, 1939, Serial No. 288,614

7 Claims. (Cl. 88—20)

This invention relates to the determination of "dark adaptation" of individuals, as in the investigation of avitaminosis A, and to a preferred form of apparatus by which the method may be practiced.

One of the particular objects of the invention is to provide an apparatus which wholly eliminates the personal equation of the operator or investigator making the examination of the individual, wherefore the results obtained may be attributed solely to the reactions of the individual under test.

A further object of the invention is to provide an apparatus of the character described utilizing a two step measurement of the reaction time of the subject required to reach two different predetermined visibility-threshold values, in succession.

During the past decade numerous investigators have appreciated that avitaminosis A is characterized by what is termed "night blindness," and numerous forms of apparatus have been devised for the estimation of the degree of night blindness in individuals, which apparatus have for the most part relied upon concurrent observations by the investigator and the subject under test, thereby introducing the personal equation of the investigator. Furthermore, the prior suggested forms of apparatus as well as the methods of test employed therewith have required a certain degree of familiarity with the apparatus and procedure on the part of the subject (and particularly on the part of the investigator) in order to secure reliable test data.

According to the present invention, the subject under test may be subjected to the customary "bleaching" light to effect the desired degree of bleaching of the visual purple, after which a dim light of small area is established in the field of vision of the subject at a position such as to cause the image thereof to fall on the retina at a point removed from the fovea, and the observer is instructed to depress a conveniently located push button when this dim light is observed. On this occasion an indication is recorded of the elapsed time required for the eyes of the subject to become adapted to this dim light, and the intensity of the light is simultaneously reduced and the subject instructed to again depress the push button when the dimly illuminated area is again observed, which latter occasion is suitably recorded so that the total time interval between the cessation of the bleaching light and the successive observations of the area of lowered intensity is recorded.

The apparatus of the present invention comprises, essentially, means defining an observation area of such dimensions with respect to the position at which the observer's eyes will be disposed as to cover a rather large angular field of view and means for illuminating this area substantially uniformly to establish a "bleaching" light, a bright spot illuminator arranged to illuminate a restricted area of the observation area, and a test area illuminator adapted to illuminate a restricted portion of the observation area at a low intensity level and at a position angularly removed from the position of the bright spot aforementioned, together with circuit means adapted to cause energization of the bright spot and test area illuminators immediately following the extinction of the illumination over the entire observation area, to establish the aforesaid bright spot (on which the subject maintains his visual attention throughout the test) at an intensity level such that it will shortly be observed, and the test area at an intensity level such as to be observed by a normal subject within approximately one to two minutes, and a lapsed time-indicating means under the control of the subject for indication of the moment at which the illuminated test area becomes discernible by the subject, and including also circuit means operable to establish, coincidently with such indication by the subject, the intensity level of the illuminated test area at a lowered value such as to be discernible by a normal subject within a period of from two to four minutes after extinction of the wide angle observation area (the "bleaching" light), and a second elapsed time-indicating means under the control of the subject for indicating the moment at which the test area becomes discernible at such lowered intensity level.

Other objects and features of the invention will be brought out in the ensuing description of a preferred embodiment thereof, or will be apparent therefrom. The accompanying drawings illustrate such preferred embodiment, and referring thereto:

Figs. 2 and 3 illustrate respectively, on enlarged scale, forms of bright spot and test area illuminators which may be employed according to the showing in Fig. 1; and Figs. 4 and 5 illustrate the appearance of the field of view of the subject undergoing test, according to two separate embodiments of the invention.

Figure 1:
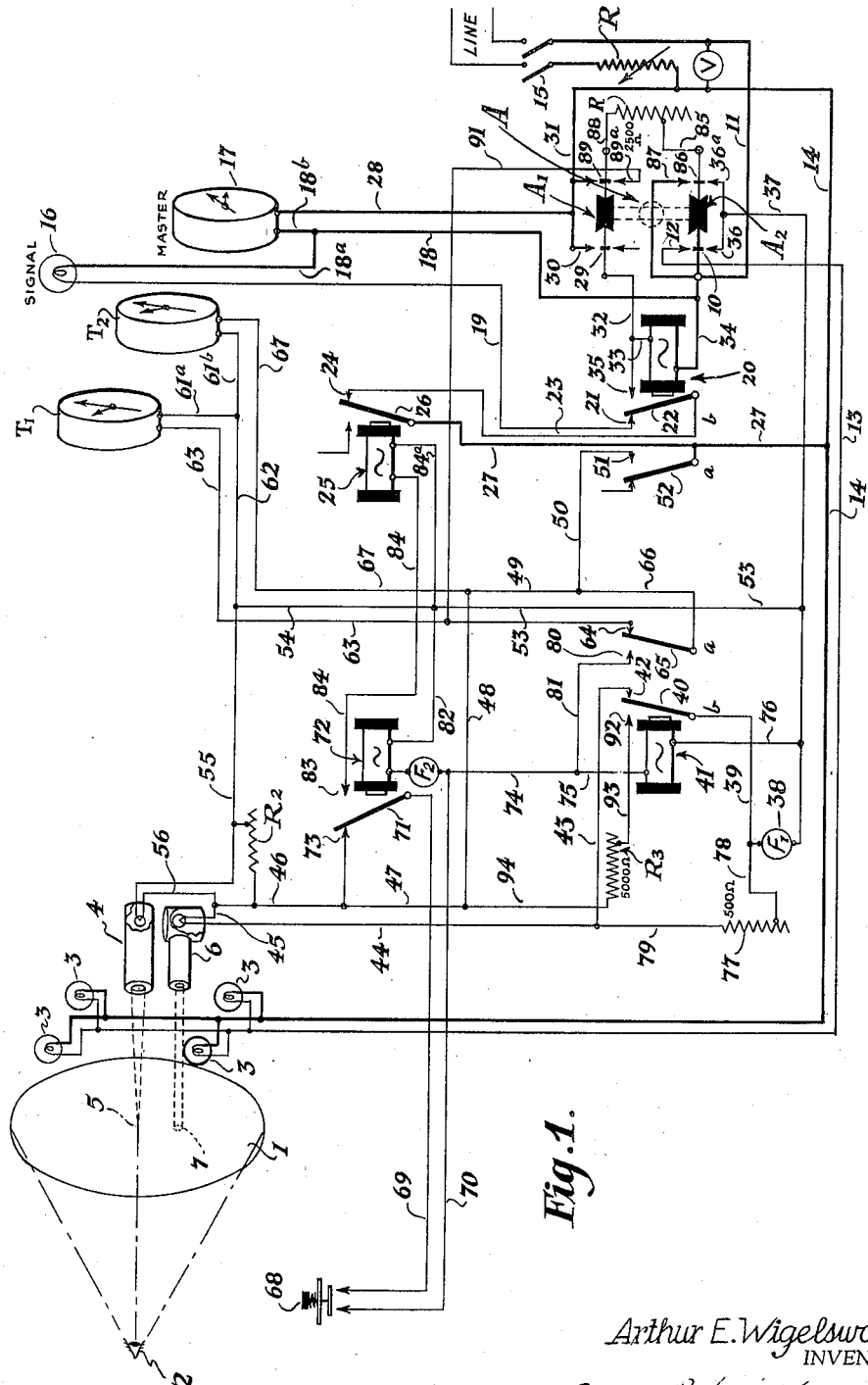
Fig. 1 is a schematic diagram of the apparatus elements according to this invention.

Referring to the drawings, an observation area is defined by a translucent screen 1 positioned so as to be viewed by the subject, one of whose eyes is indicated at 2, and to subtend a rather wide visual angle, preferably such as to secure a retinal exposure over an area extending at least 15° or 20° outwardly of the fovea. The observation area is illuminated in any suitable manner, such as by means of a bank of lamps 3 spaced rearwardly of screen 1 a sufficient distance to provide substantially uniform illumination thereof. A bright spot illuminator 4 is provided to project a small spot of light on the screen 1 at a position which may be adjacent the center thereof (in this particular form of the apparatus), as at 5, a suitable form of such bright spot illuminator being more particularly shown in Fig. 2. A test area illuminator is indicated at 6 adapted to throw a spot of light onto the screen 1 at a position such as indicated at 7 which is angularly removed from the position of the spot 5 an amount sufficient to cause the retinal image thereof to be established outside the foveal area of the eye when the eye is directed specifically at the spot 5.

In order to first illuminate the entire observation area or screen 1 with a light of sufficient intensity to produce the desired "bleaching" effect on the eyes of the subject, i. e., to "bleach" the visual purple, I energize the bank of lamps 3 by movement of a master switch A to an upper position (the switch being illustrated in Fig. 1 as being in a neutral position) which causes electrical connection of movable contact 10 of switch A (which is connected to one side of the line through conductor 11) to engage fixed contact 12 which is connected to one side of the bank of lamps 3 through conductor 13, the other side of the bank of lamps 3 being connected to the other side of the line through conductor 14. Prior to the energization of the lamps 3, with main line switch 15 closed, I preferably cause a signal lamp 16 to be lighted and a master clock 17 to be operated. Energization of the lamp 16 and clock 17 is conveniently provided by connecting one side of each to one side of the line through conductors 13, 18a, and 18b, the return circuit for the lamp 16 being provided through a conductor 19 to the rest contact 21 of a relay 20, thence through armature 22 of said relay to conductor 23 to rest contact 24 of a second relay 25, thence through armature 26 thereof through conductor 27 to the conductor 14 which connects with the other side of the line above described. This insures that the signal lamp 16 will burn if the main switch 15 is closed and the relays 20 and 25 are unenergized. The return circuit for the clock 17 may comprise a conductor 28 communicating with the other side of the line in common with the conductor 14.

Upon movement of the switch A to its upper position as above described, movable contact 29 thereof will engage fixed contact 30, which is connected to one side of the line through conductor 31, and through conductors 32 and 33 will energize the coil of relay 20 which is connected to the other side of the line through conductor 34. Upon energization of the coil at relay 20, the connection between armature 22 and contact 21 will be broken, thus extinguishing lamp 16. Movement of the armature 22 into engagement with the energized contact 35 of relay 20 will provide, through conductor 33, contact 35, armature 22, conductor 23, contact 24, armature 26, conductors 27 and 14, a return circuit for the coil of relay 20 which is in parallel with the contacts 29 and 30 as long as the switch A is in upper position but which will persist in order to hold the relay 20 closed when the switch A is moved to its lower position as is hereinafter described. When switch A is in the upper position, therefore, the master clock 17 is operating, the signal 16 is extinguished, the relay 20 is closed, and the bank of lamps 3 is burning.

After the lapse of a convenient time interval during which the subject is exposed to the bleaching light provided by the bank of lamps 3, for example approximately three minutes, as determined by the operator having the master clock 17 within his field of view, the bleaching light is extinguished by the operator by moving the switch A to its lower position, which breaks the contacts 10 and 12. In this position of the switch the master clock 17 continues to run (as it will throughout the test as long as line switch 15 is closed) and the test area 7 and bright spot 5 are illuminated in the following manner (it being appreciated however, that the test area 7 and the bright spot 5 may be caused to be illuminated during the bleaching period, if desired, although this is unnecessary):

Movable contact 10 is brought into engagement with fixed contact 36, which connects conductor 37 to one side of the line, said conductor 37 leading to a flasher button F1 (employed to cause the test area 7 to "blink"), thence through conductor 39 to armature 40 of a relay 41, thence to rest contact 42 through conductors 43 and 44 to one side of the lamp in illuminator 6, thence through conductors 45, 46, 47, 48, 49 and 50, to energized contact 51 of relay 20, thence through a second armature 52 of said relay, which was moved to its energized position when switch A was first operated, to conductor 27 which connects with conductor 14 as aforesaid. The illumination of the bright spot is obtained through contacts 10 and 36, conductor 37, branch conductors 53, 54, and 55, to one side of the lamp of illuminator 4, thence through conductors 56, 46, 47, 48, 49, 50, contact 51, armature 52, and conductors 27 and 14 as above.

When lamps 3 are extinguished and the illuminators 4 and 6 energized, the "dark adaptation" period is in progress, and in order to measure the duration of this period according to this invention I provide two separate timing clocks T1 and T2. These timing clocks are energized upon moving switch A to its lower position, through conductors 61a and 61b which connect to the respective clocks T1 and T2, thence to a common conductor 62 connecting with conductor 54 leading to conductor 37 through conductor 53, which places one side of the clocks on the line through contacts 10 and 36. The return circuit for clock T1 comprises conductor 63, rest contact 64 of relay 41, armature 65 of said relay, conductor 66, conductor 50, contact 51, armature 52, conductor 27 and conductor 14 which connects with the other side of the line. The return circuit for clock T2 comprises conductor 67, conductors 49 and 50, contact 51, armature 52, conductor 27, and conductor 14.

With the switch A in lower position, therefore, the illuminators 4 and 6 are operating, together with the clocks T1 and T2. When the subject discerns the illuminated area 7, he will depress push button 68 which closes relay 41 and connects a resistance in the series connection with the lamp of illuminator 6 and stops clock T1 as follows:

The push button 68 shorts between conductors 69 and 70, the former of which is connected to one side of the line through armature 71 of a fourth relay 72 which connects through rest contact 73 with conductors 47, 48, 49 and 50, contact 51, and armature 52 to conductors 27 and 14, the conductor 70 being connected to the coil of relay 41 through conductors 74 and 75, thence through to line conductor 11 through conductors 76 and 37, and contacts 36 and 10. The energization of the coil of relay 41 opens the circuit to the illuminator 6 which had extended through conductor 39, armature 40, rest contact 42, and conductor 43, wherefore the current supply to the lamp of illuminator 6 is supplied through resistor 77 through conductors 78 and 79. The timing clock $T_1$ is stopped by an interruption of its return circuit defined by conductor 63, contact 64, armature 65, and conductors 66, 50, etc., by the movement of armature 65 away from contact 64. When the push button 68 is closed momentarily, the movement of armature 65 into engagement with energized contact 80 of relay 41 maintains the current supply to the coil of relay 41 through conductors 81 and 75 on one side and conductors 66 and 50, contact 51, armature 52, and conductors 27 and 14 to the line. At this time the clock $T_2$ is still operating, the illuminator 4 is still producing the spot 5, and the illuminator 6 is operating at a reduced intensity so that the test area 7 is established at a lower intensity value. In order that the subject may employ the same push button to indicate the moment at which he again discerns the area 7, I provide a delayed action for the relay 72, which controls the operation of relay 25 which in turn stops the clock $T_2$, turns off illuminators 4 and 6, and causes the signal lamp 16 to again light, indicating the full termination of the test and the readiness of the equipment to repeat the cycle of operations. This delayed action is conveniently secured by incorporating a flasher button $F_2$ in the line which energizes the coil of relay 72. As above described, upon operation of relay 41 the conductor 74 is placed in connection with one side of the line, and I connect flasher $F_2$ to conductor 74, thence to the relay 72, the return circuit for the relay 72 comprising conductor 82 connecting with conductor 53 which connects to line conductor 11 through conductor 37 and contacts 36 and 10. The flasher button $F_2$ is of that type which has a high resistance when first energized but heats up under the current then flowing and operates to short out this high resistance to apply the full voltage to the relay 72 and then cools sufficiently to change to the high resistance condition. When the flasher button "flashes" the current surge permitted thereby is sufficient to operate the relay 72, which pulls the armature 71 into contact with the energized contact 83, and when the flasher returns to high resistance condition the current which it permits to flow in that condition is sufficient to maintain the relay 72 in its closed position throughout the remainder of the test (it being appreciated that subsequent "flashes" of the flasher $F_2$ will have no effect on the relay). The delay occasioned by the time required for the flasher button to "flash" the first time, a matter of five or ten seconds, is sufficient to insure that a premature subsequent operation of the push button 68 by the subject following close upon the first operation which stopped clock $T_1$, will not stop clock $T_2$ (the circuit arrangement for stopping clock $T_2$ being described more fully hereinbelow).

Where a single switch member such as the push button 68 is provided for the subject as described in this specific embodiment of the invention, this time delay is essential to prevent immediate stopping of the clock $T_2$ due to the immediate connection of the relay 72 in the circuit. The time delay of about five (5) seconds is also desirable inasmuch as it has been found from experience that the subject might press the push button 68 more than once during the few seconds of indecision regarding whether or not he definitely discerns the area 7. Those skilled in the art will appreciate that should it be considered desirable to provide separate switch members for the subject whereby he may indicate his two observation instances by separate operations of the switches, this time delay feature of the invention may be omitted.

When the relay 72 is operated, causing the armature thereof 71 to engage contact 83, a subsequent operation of the push button 68 will cause operation of relay 25 through conductor 84, the return circuit for the coil of relay 25 being provided through conductor 84a which is connected to the common sides of the two clocks $T_1$ and $T_2$ and thence to the line conductor 11. Operation of relay 25 breaks the contact between armature 26 and contact 24 which breaks the return circuit of the coil of relay 20 which had been established through conductor 33, contact 35, armature 22, and thence through contact 24 of relay 25 to conductor 14, allowing the relay to move to its rest position shown in the drawings. In this rest position the supply circuit to clock $T_2$ is interrupted and the return circuit for the illuminators 4 and 6 is disconnected by the disengagement of armature 52 from contact 51, and as soon as the push button 68 is released by the subject the armature 26 is released by the coil of relay 25, again closing the contact 24—26 which provides a return circuit for the signal lamp 16 through armature 22 of relay 20, contact 21, and conductor 19.

In order to keep a substantially constant voltage on the system, so that the intensity of illumination of the test area 7 by the lamp 6 will be kept at a substantially constant or predetermined value throughout the test period (and so that successive tests on the same individual will have the same significance) I provide a variable resistor R in the current supply line, with a voltmeter V across the supply line in advance of the main apparatus circuit, together with certain load-balancing resistors hereinbelow described. The voltage may be adjusted at some suitable value, preferably one below that to which the voltage will drop in the main supply line, for example, at a voltage of 100 volts with a 110 volt supply. This voltage may be adjusted during the "bleaching" period, and I preferably provide means for maintaining the load of the circuit substantially constant throughout the test, whereby the operator having the master clock 17 in his field of view may observe the voltmeter V and keep it at the value decided upon, by manipulation of the resistance R during the progress of the test. The load on the circuit is maintained at a substantially constant value through the provision of fixed resistors $R_1$, $R_2$ and $R_3$ which are shunted in and out of the circuit as the various changes take place in the circuit during the test procedure.

When the switch A is in the upper position, and the "bleaching" period is in progress, the load of the circuit comprises the clock 17, the bank of lights 3, the relay 20, and the resistor $R_1$. This resistor is connected across the main supply line through the switch A, one side of the resistor going to the lead 11 through connector 85, contact point 86, connector 87, thence to said lead 11. The other side of the resistor $R_1$ is connected to the other side of the line through lead 88 and contact 89 to the conductor 31. When the switch A is moved to its lower position, extinguishing the bank of lamps 3 and lighting the lamps 4 and 6, the load would nominally comprise the two lamps 4 and 6, the clocks $T_1$ and $T_2$, the clock 17, the relay 20, and the resistor $R_1$ remains in the circuit, being connected to one side of the line through the conductor 85, contact 86, contact 36a, thence through contact 10 to the lead 11, and to the other side of the line through conductor 88, contacts 89 and 89a, conductor 91, conductor 63, contact 64, armature 65, conductor 66, conductor 50, contact 51, armature 52, and conductor 27 to the other line lead 14. With the circuit in this condition, the load represented by the lamps 4 and 6 and the clocks $T_1$ and $T_2$ may substantially balance the load previously offered by the bank of lamps 3, wherefore the circuit is under substantially the same condition of loading as it was during the "bleaching" period. In usual constructions, however, the load of the lamps 3 is somewhat greater than the combined load of the lamps 4 and 6, clocks $T_1$ and $T_2$, etc., and in order to secure a more accurate balance in the circuit I may provide a second fixed resistor $R_2$ across the line (as across the leads to the lamp 4, for example). When the subject operates the push-button 68 the first time, the clock $T_1$ is stopped and the lamp 6 continues to burn at a reduced intensity, as above described. In this condition, the relay 21 is closed and the relay 72 closes very shortly thereafter. In this condition the load comprises the lamp 4, the resistor $R_2$, the lamp 6 plus its current reducing resistor 77, the relay 72, relay 41, relay 20, clock 17, and clock $T_2$. The resistor $R_3$ is also shunted in at this time and the resistor $R_1$ is taken out of the circuit (the difference between resistors $R_1$ and $R_3$ being such as to take care of the resistance changes caused by stopping clock $T_1$, operating the lamp 6 at reduced intensity, and operating the relays 41 and 72), the resistor $R_1$ being taken out by the opening of the circuit between the contact 64 and the armature 65 and the resistor $R_3$ being shunted in through the operation of the relay 41, the armature 40 of which makes contact with the energized contact 92 and shunts the resistor across the line by connecting one side of the resistor through the conductor 93, contact 92, armature 40, conductor 39, flasher $F_1$, to lead 37 which connects with the line lead 11, and at the other side through conductor 94 connecting with conductors 48, 49, and 50, contact 51, armature 52, conductor 27, and conductor 14. Due to the fact that part of the load is connected to the flasher buttons $F_1$ and $F_2$, the voltmeter will fluctuate slightly during the dark adaptation portion of the test, and this slight fluctuation of the voltmeter is clear indication to the operator that the lamp 6 is operating.

The master switch A has been described as a single switch which may be called a four-pole, double-throw switch with an off position the switch may actually comprise two double-pole double-throw switches each having an off position. Thus the switch A may be made up of two switches $A_1$ and $A_2$ which are mechanically linked to one another as shown so as to operate simultaneously. However, this mechanical linkage may be omitted and the switches may be operated separately and not necessarily simultaneously, and this terminology is adhered to in the claims.

The above specific description is directed to the establishment of an observation area which effects a "bleaching" of the retina substantially symmetrically about the foveal area, as illustrated particularly in Fig. 4. This arrangement requires that the bleaching be extended over a rather wide retinal angle, so that the retinal image of the test area 7 will be sure to fall well within the bleached area. It has been found that some subjects will not constantly direct their attention at the position of the spot 5 during the bleaching period in view of the nervous tendency for the subject's eye to wander about the observation area during the bleaching period. Where it is desirable to utilize a more restricted observation area, for example, I may establish the point 7 substantially centrally of the observation area, and cause the subject to direct his attention to a point eccentric of the observation area, realizing an unsymmetrical bleaching of the retina with respect to the foveal area while insuring the substantially central placement of the retinal image of the test area 7 with respect to such bleached portion of the retina. This latter construction is exemplified in Fig. 5 where the observation area is designated at 1a, the centrally disposed test area is indicated by the dotted circle at 7a, and the position of the bright spot is indicated at 5a. A suitable marking will be provided at the position 5a on which the subject may direct his attention during the bleaching period, as above described.

In Figs. 2 and 3 I have illustrated the lamps 4 and 6, respectively, and these lamps comprise essentially means for directing spots of light of the correct intensity and degree of localization onto the surface 1. The lamp 4 may comprise a housing 95 carrying a lamp 96 mounted in a suitable socket or receptacle 97 and provided with leads 98, a stop member 99 provided with a small aperture 99a, and a lens 100. A second stop member is preferably provided at the lens 100 as at 101 to increase the definition of the lamp 100 and provide the desired small spot 5 on the surface 1. The lamp 6 may comprise a housing 102 provided with a lamp 103 carried by a suitable receptacle 104 and provided with lead connections 105, a diffusing disk such as of milk glass or the like at 106, a filter 107, an aperture 108 and a lens 109. The filter 107 is of a deep purple color particularly adapted to restrict the subject's vision of the test area 7 to a rod function of the eye at the intensities employed. Suitable variations of the construction of lamps 4 and 6 will occur to those skilled in the art, and I do not choose to be limited to the specific forms herein delineated and described.

The operation of the device is extremely simple, both from the standpoint of the subject and the operator. The subject has merely to observe the small spot 5, after the bleaching period, and when the larger test area 7 is discerned as a blinking spot of light, the subject has merely to depress the push button 68.

In this connection, I prefer to place some form of indicator mark at the position of the spot 5, wherefore the subject's attention may be directed to the location of the spot 5 and adequate "bleaching" will be secured over an area such as to include the position of the test area 7.

As above brought out, should the push button 68 be depressed more than once at the moment of indecision on the part of the subject as to whether the test area 7 is actually discerned or not, no operation of the relay 72 will be obtained. The depression of the push button 68 will stop the clock $T_1$ and reduce the intensity of illumination of the test area 7. When the subject again discerns the test area 7, the push button 68 is again depressed, stopping the clock $T_2$ and extinguishing the lamps 4 and 6. The last depression of the push button 68 also releases the relay 20 as above described, causing the signal lamp 16 to again light, which comprises an indication to the operator that the test has been completed. The main lights in the room are then turned on and the operator may read the results of the test by inspection of the clocks $T_1$ and $T_2$. As above brought out, a normal subject will see the test area in a space of about one to two minutes for the first time, and within a space of from two to four minutes for the second time. Depending upon the degree of avitaminosis A in the subject, the observation time for the respective intensities of illumination may be as long as 10 and 30 minutes, respectively. Intermediate time values are a fair indication of the degree of avitaminosis A.

The provision of successive testing of the "dark adaptation" characteristics of the subject at two different intensity levels of the test area is of particular advantage in the utilization of the instrument by the physician for diagnosis of avitaminosis A. It will be appreciated that the present device is so designed as to place a minimum of responsibility on the operator supervising the test, wherefore the personal equation of such operator is substantially, if not wholly, eliminated from the diagnosis, making the device subject to operation by substantially any person. The double measurement of the subject's dark adaptation serves as a prompt and critical indication of the degree of avitaminosis A in the subject inasmuch as in the case of a subject having a mild degree of avitaminosis A, the second test period at the lowered intensity is more critical, while in cases of marked avitaminosis A the test at the higher intensity level is sufficiently critical and at the same time more useful in view of the shorter test time required. For example, in the case of a mild avitaminosis A the subject might discern the light at its higher intensity at a period well within the normal time of from 1 to 2 minutes yet on the succeeding test at the lowered intensity level it will be found that the observation will occur much later than with a normal subject, and, in a case of severe avitaminosis A the light might not be observed at its higher intensity until an elapse of 5 or 6 minutes (in which case the light at lowered intensity might not be observed for 25 minutes or more) wherefore the test may be discontinued by omission of the lowered intensity level observation, inasmuch as the physician has been furnished with sufficient information to make a definite diagnosis. The use of the successive observations at different intensity levels also serves as a confirmation of the test, inasmuch as a variation in the two readings beyond the normal variation between readings, i. e., beyond a ratio of about 1:2, for example, indicates an error in the test. Such abnormal variations have been found to occur in the following circumstances:

(a) Where the subject has misunderstood or misinterpreted the test instructions;
(b) Where the subject inadvertently or accidentally depresses the push button 68 before he actually intended to do so; and
(c) Where the subject has been careless in maintaining his directed attention to the bright spot, so that the test area subsequently becomes exposed to an unbleached or inadequately bleached portion of the retina.

Modifications of the specific structures shown herein will occur to those skilled in the art, and I do not choose to be limited to the specific embodiment herein set forth, but rather to the scope of the subjoined claims.

I claim:

1. An apparatus of the character described, comprising: screen means defining an observation area positioned to be viewed by a subject; means for illuminating such area substantially uniformly; illuminating means positioned to direct a small spot of light onto said observation area; another illuminating means positioned to direct a spot of illumination on said observation area to define a test area of restricted intensity at a position angularly removed from said bright spot and including means for causing said illuminating means to illuminate said test area at two different intensity levels; two elapsed-time-indicating elements; a source of electrical energy; switch means associated with said source and operable to energize said first-mentioned illuminating means; switch means associated with said source and operable to energize said second and third-mentioned illuminating means; and circuit means associated with said switch means, with all of said illuminating means, and with said time-indicating elements, and including switch means under control of the subject, said circuit means being adapted to effect operation of said time-indicating elements in consonance with the operation of said third-mentioned illuminating means at said two intensity levels, whereby the elapsed time of illumination of said test area at the respective intensity levels is indicated.

2. An apparatus of the character described, comprising: Screen means defining an observation area positioned to be viewed by a subject; means for illuminating such area substantially uniformly; illuminating means positioned to direct a small spot of light onto said observation area; a second illuminating means positioned to direct a spot of illumination on said observation area to define a test area of restricted intensity at a position angularly removed from said bright spot and including means for causing said illuminating means to illuminate said test area at two different intensity levels; two elapsed-time-indicating elements; a source of electrical energy; switch means associated with said source and operable to energize said first-mentioned illuminating means; switch means associated with said source and operable to energize said second and third-mentioned illuminating means; and circuit means associated with all of said illuminating means and with said time-indicating elements, and including switch means under control of the subject, said circuit means being adapted to start operation of said elapsed-time indicating elements upon extinction of said first-mentioned illuminating means and to establish said third-mentioned illuminating means to illuminate said test area at the higher of said two different intensity levels, and being further adapted upon operation of said last-mentioned switch means by said subject to stop one of said time-indicating means and coincidently establish said third-mentioned illuminating means so as to illuminate said test area at the lower of said two different intensity levels, and to stop the other of said time-indicating means upon a second operation of said last-mentioned switch means by said subject, whereby the elapsed time of illumination of said test area at the respective intensity levels is indicated.

3. An apparatus of the character described, comprising: screen means defining an observation area positioned to be viewed by a subject; means for illuminating such area substantially uniformly; illuminating means positioned to direct a small spot of light onto said observation area; a second illuminating means positioned to direct a spot of illumination on said observation area to define a test area of restricted intensity at a position angularly removed from said bright spot and including means for causing said illuminating means to illuminate said test area at two different intensity levels; two elapsed-time-indicating elements; a source of electrical energy; circuit means associated with said illuminating means and said time-indicating means and including switch means associated with said source of electrical energy and operable to (a) illuminate said observation area through energization of said first-mentioned illuminating means, (b) deenergize said first-mentioned illuminating means and energize said second and third illuminating means, and energize said elapsed-time-indicating element, to establish illumination of said test area at the brighter of said two different intensity levels, (c) deenergize one of said elapsed-time-indicating elements and consonantly reestablish said third-mentioned illuminating means to illuminate said test area at the lower of said two different intensity levels, and (d) deenergize the second elapsed-time-indicating element.

4. The structure set forth in claim 3, said circuit means including a switch member under control of the subject, said switch member being coordinated with the balance of said circuit means to effect the change from status $b$ to status $c$, and to effect the change from status $c$ to status $d$ in response to operation of said switch means by said subject.

5. The structure set forth in claim 3, said circuit means including a switch member under control of the subject, said switch member being coordinated with the balance of said circuit means to effect the change from status $b$ to status $c$, and to effect the change from status $c$ to status $d$ in response to operation of said switch means by said subject, and comprising in addition, circuit-balancing means incorporated in said circuit means for maintaining the load of said circuit at a substantially constant value throughout changes in the status of said circuit from status $a$ through status $c$.

6. The structure set forth in claim 3, said circuit means including a switch member under control of the subject, said switch member being coordinated with the balance of said circuit means to effect the change from status $b$ to status $c$, and to effect the change from status $c$ to status $d$ in response to operation of said switch means by said subject, and comprising in addition, time delay means associated with the switch means under the control of the subject adapted to render said switch means ineffective to change the circuit status from status $c$ to status $d$ during a predetermined interval of time following the operation of said switch means by the subject which changes the status of said circuit from status $b$ to status $c$.

7. An apparatus of the character described, comprising: screen means defining an observation area positioned to be viewed by a subject; index means on said observation area positioned eccentrically thereof; means for illuminating such area substantially uniformly; illuminating means positioned to direct a small spot of light onto said observation area at the position of said index; another illuminating means positioned to direct a spot of illumination on said observation area to define a test area of restricted intensity at a position substantially centrally of said observation area and including means for causing said illuminating means to illuminate said test area at two different intensity levels; two elapsed-time-indicating elements; a source of electrical energy; switch means associated with said source and operable to energize said first-mentioned illuminating means; switch means associated with said source and operable to energize said second and third-mentioned illuminating means; and circuit means associated with said switch means, with all of said illuminating means, and with said time-indicating elements, and including switch means under control of the subject, said circuit means being adapted to effect operation of said time-indicating elements in consonance with the operation of said third-mentioned illuminating means at said two intensity levels, whereby the elapsed time of illumination of said test area at the respective intensity levels is indicated.

ARTHUR E. WIGELSWORTH.